(12) United States Patent
Mah et al.

(10) Patent No.: US 7,833,665 B2
(45) Date of Patent: Nov. 16, 2010

(54) POLYSILOXANE COMPOUND CONTAINING SULFONIC ACID GROUPS, METHOD OF PREPARING THE SAME AND FUEL CELL INCLUDING THE SAME

(75) Inventors: Sang-kook Mah, Seoul (KR); Do-yun Kim, Seongnam-si (KR); Jin-gyu Lee, Seoul (KR); Myung-sup Jung, Seongnam-si (KR); Jao-jun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1030 days.

(21) Appl. No.: 11/521,931

(22) Filed: Sep. 14, 2006

(65) Prior Publication Data

US 2007/0196713 A1     Aug. 23, 2007

(30) Foreign Application Priority Data

Feb. 21, 2006   (KR) ................. 10-2006-0016674

(51) Int. Cl.
*H01M 6/16* (2006.01)
(52) U.S. Cl. .................. 429/313; 429/33; 429/44; 521/25; 528/391
(58) Field of Classification Search .............. 429/33, 429/313, 44
See application file for complete search history.

(56) References Cited

U.S. PATENT DOCUMENTS 3,468,836 A * 9/1969 Kazys ............... 524/506
5,429,759 A * 7/1995 Andrieu et al. ........... 252/62.2
6,447,952 B1 * 9/2002 Spiegel et al. ........... 429/218.1
2006/0159972 A1 * 7/2006 Nodono ..................... 429/30

FOREIGN PATENT DOCUMENTS

| JP | 03-285976 | 12/1991 |
|----|-----------|---------|
| JP | 04-120014 | 4/1992 |
| JP | 06-025420 | 2/1994 |
| JP | 06-192040 | 7/1994 |
| JP | 06-207021 | 7/1994 |
| JP | 06-247827 | 9/1994 |
| JP | 06-247835 | 9/1994 |
| JP | 06-511509 T | 12/1994 |

(Continued)

OTHER PUBLICATIONS

SIPO Office action dated Nov. 6, 2009, for corresponding Chinese application 200610154324.6 with English translation.

(Continued)

*Primary Examiner*—Melvin Curtis Mayes
*Assistant Examiner*—Melissa Stalder
(74) *Attorney, Agent, or Firm*—Christie, Parker & Hale, LLP

(57) ABSTRACT

A polysiloxane compound and a fuel cell including the same where the polysiloxane compound is an organic polymer siloxane compound containing sulfonic acid groups. By using the organic polymer siloxane compound containing sulfonic acid groups, a polymer electrolyte membrane having superior characteristics such as dimensional stability and ionic conductivity, without affecting the amount of methanol crossover, can be obtained by reducing swelling due to liquids.

15 Claims, 1 Drawing Sheet

FOREIGN PATENT DOCUMENTS

| | | |
|---|---|---|
| JP | 2003-331644 | 11/2003 |
| JP | 2003-331645 | 11/2003 |
| JP | 2003-335818 | 11/2003 |
| JP | 2004-107597 | 4/2004 |
| JP | 2004-307737 | 11/2004 |
| JP | 2004-346133 | 12/2004 |
| JP | 2004-346316 | 12/2004 |
| JP | 2005-190813 | 7/2005 |
| JP | 2006-114277 | 4/2006 |
| JP | 2006-134765 | 5/2006 |
| JP | 2006-249160 | 9/2006 |
| JP | 2007-048655 | 2/2007 |
| JP | 2007-504637 T | 3/2007 |
| WO | WO 2004/070738 A1 | 8/2004 |
| WO | WO 2004/112177 A1 | 12/2004 |

OTHER PUBLICATIONS

Japanese Office action dated Nov. 6, 2009, for corresponding Japanese application 2007-031821, noting listed references in this IDS.

* cited by examiner

POLYSILOXANE COMPOUND CONTAINING SULFONIC ACID GROUPS, METHOD OF PREPARING THE SAME AND FUEL CELL INCLUDING THE SAME

CROSS-REFERENCE TO RELATED PATENT APPLICATION

This application claims priority to and the benefit of Korean Patent Application No. 10-2006-0016674, filed on Feb. 21, 2006, in the Korean Intellectual Property Office, the disclosure of which is incorporated herein in its entirety by reference.

BACKGROUND OF THE INVENTION

1. Field of the Invention

The invention relates to an organic polymer siloxane compound containing sulfonic acid groups and a fuel cell including the same, and more particularly, to an organic polymer siloxane compound containing sulfonic acid groups which, by reducing swelling, has superior dimensional stability and ionic conductivity without affecting the amount of methanol crossover, and a fuel cell including the same.

2. Description of the Related Art

A fuel cell is an electrochemical device which directly transforms chemical energy of hydrogen and oxygen, which are contained in hydrocarbon materials such as methanol, ethanol, and natural gas, into electric energy. The energy transformation process of fuel cells is very efficient and environmentally-friendly, thereby drawing attention for the past several decades, and the development of various types of fuel cells has been attempted.

Fuel cells can be classified into Phosphoric Acid Fuel Cells (PAFC), Molten Carbonate Fuel Cells (MCFC), Solid Oxide Full Cells (SOFC), Polymer Electrolyte Membrane Fuel Cells (PEMFC), and Alkaline Full Cells (AFC) according to the type of electrolyte used. All fuel cells operate on the same principle, but the type of fuel, operating temperature, catalyst, and electrolyte used are different. In particular, PEMFCs can be used in small-sized stationary power generation equipment or transportation systems due to low operating temperature, high output density, rapid start-up, and power response to variations of required output.

The core part of a PEMFC is a Membrane and Electrode Assembly (MEA). A MEA includes a polymer electrolyte membrane and two electrodes which are generally attached to both sides of the polymer electrolyte membrane and independently act as a cathode and an anode.

The polymer electrolyte membrane acts as a separator blocking direct contact between an oxidizing agent and a reducing agent, and electrically insulates the two electrodes while conducting protons. Accordingly, a good polymer electrolyte membrane has high proton conductivity, good electrical insulation, low reactant permeability, excellent thermal, chemical, and mechanical stability under normal fuel cell conditions, and a low price.

In order to meet these requirements, various types of polymer electrolyte membranes have been developed, and, in particular, high fluorinated polysulfonic acid membranes have been developed due to their excellent durability and performance and one of these, a NAFION® membrane is a standard. However, the NAFION membrane needs to be sufficiently moisturized and used at 80° C. or less to prevent moisture loss.

Moreover, in a Direct Methanol Fuel Cell (DMFC), an aqueous methanol solution is supplied as a fuel to the anode and a portion of non-reactive aqueous methanol solution is permeated to the polymer electrolyte membrane. The non-reactive aqueous methanol solution that permeates to the polymer electrolyte membrane causes a swelling phenomenon in the polymer electrolyte membrane, and diffuses a cathode catalyst layer. Such a phenomenon, referred to as "methanol crossover," causes the direct oxidization of methanol at the cathode where an electrochemical reduction of hydrogen ions and oxygen occurs, and thus the methanol crossover results in a drop in electric potential, causing a decline in the performance of the DMFC.

Since conventional polymer electrolyte membranes do not have both excellent ionic conductivity and low methanol crossover, improvements in polymer electrolyte membranes are required.

SUMMARY OF THE INVENTION

One embodiment of the invention provides a polymer material which can remarkably reduce methanol crossover without sacrificing ionic conductivity or remarkably increase ionic conductivity without sacrificing methanol crossover, and improve dimensional stability of a polymer electrolyte membrane.

Another embodiment of the invention also provides a method of preparing a polymer material which can remarkably reduce methanol crossover without sacrificing ionic conductivity or remarkably increase ionic conductivity without sacrificing methanol crossover, and improve dimensional stability of a polymer electrolyte membrane.

A further embodiment of the invention also provides a polymer electrolyte membrane including the above polymer material.

One embodiment of the invention also provides a membrane electrolyte assembly including the above polymer material.

Another embodiment of the invention also provides a fuel cell including the above polymer material.

According to one embodiment of the invention, a polysiloxane compound is provided represented by Formula 1:

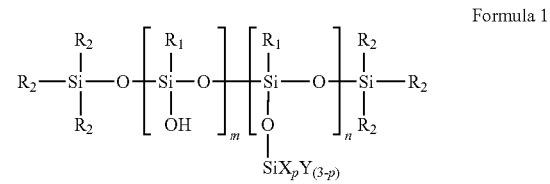

Formula 1 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Y is a $C_{1-15}$ hydrocarbon group including at least one sulfonic acid group; p is an integer from 1 or 2; m is an integer from 0 to 200; and n is an integer from 1 to 200.

According to another embodiment of the invention, a method of preparing a polysiloxane compound of Formula 1 is provided including: hydrolyzing and condensation polymerizing a compound of Formula 4 and a compound of Formula 5; and sulfonating the resultant product by oxidization if required:

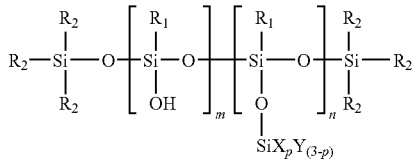

Formula 1

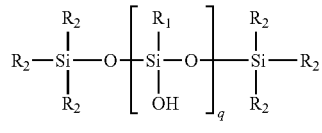

Formula 4

$SiX_rZ_{(4-r)}$                                                             Formula 5 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Z is a $C_{1-15}$ hydrocarbon group including a sulfonic acid group or a sulfur atom which can be converted into a sulfonic acid group by oxidation; r is an integer from 1 to 3; and q is an integer from 1 to 400.

According to another embodiment of the invention, a polymer electrolyte membrane is provided including a polysiloxane compound of Formula 1.

According to yet another embodiment of the invention, a membrane electrode assembly is provided including: a cathode including a catalyst layer and a diffusion layer; an anode including a catalyst layer and a diffusion layer; and a polymer electrolyte membrane interposed between the cathode and the anode, wherein the polymer electrolyte membrane includes a polysiloxane compound of Formula 1.

According to another embodiment of the invention, a fuel cell is provided including: a cathode including a catalyst layer and a diffusion layer; an anode including a catalyst layer and a diffusion layer; and a polymer electrolyte membrane interposed between the cathode and the anode, wherein the polymer electrolyte membrane includes a polysiloxane compound of Formula 1.

In one embodiment, using the polysiloxane compound including a hydrocarbon group-containing a sulfonic acid group on a side chain of the invention, a polymer electrolyte membrane which has superior dimensional stability and can remarkably reduce methanol crossover without sacrificing ionic conductivity or remarkably increase ionic conductivity without sacrificing methanol crossover can be prepared.

BRIEF DESCRIPTION OF THE DRAWINGS

The above and other embodiments of the invention will become more apparent by describing in detail exemplary embodiments thereof with reference to the attached drawings in which.

DETAILED DESCRIPTION

Figure 1:
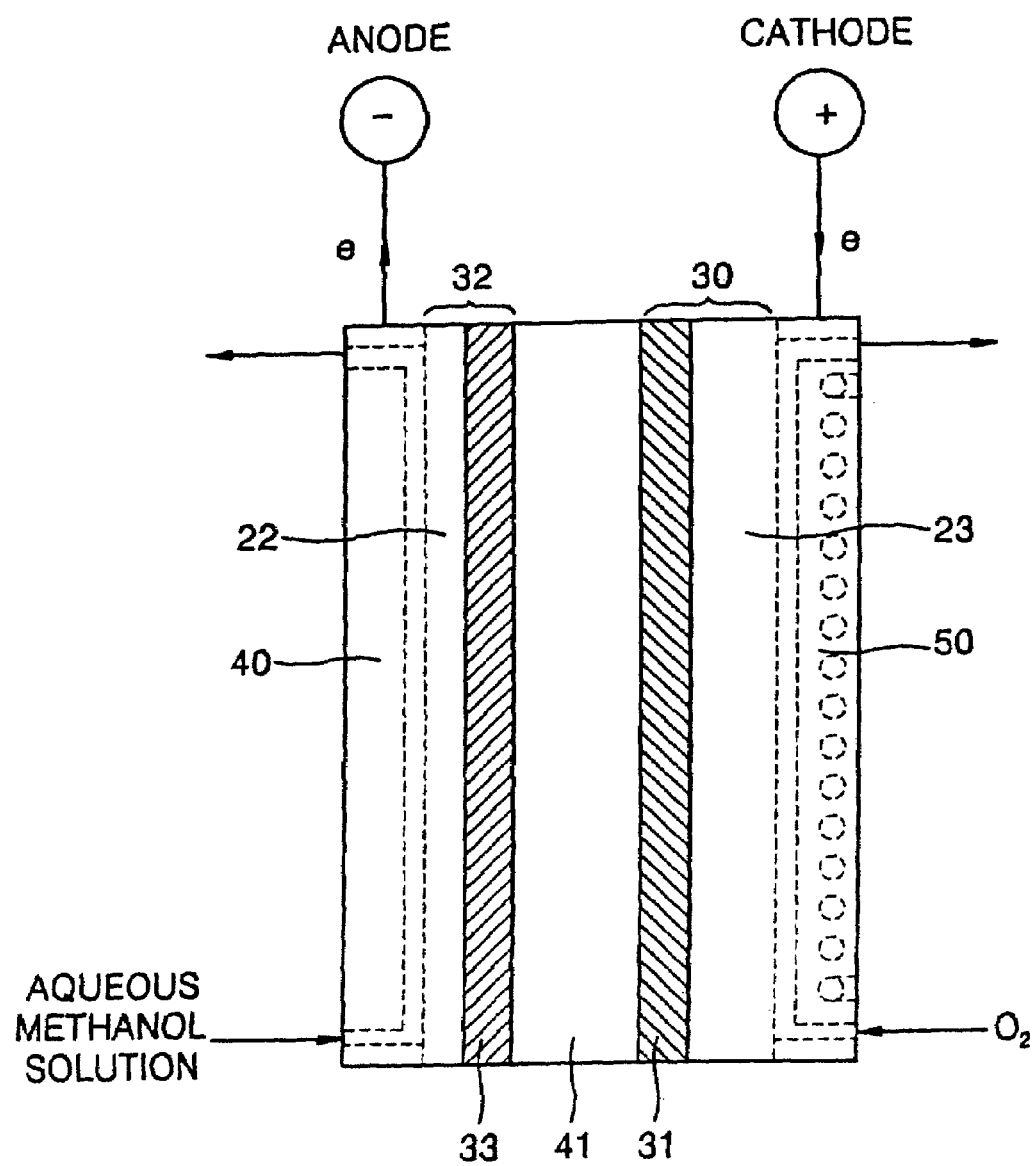
FIG. 1 is a view illustrating a structure of a direct methanol fuel cell (DMFC) according to an embodiment of the invention.

Hereinafter, the invention will be described in detail by explaining embodiments of the invention.

An embodiment of the invention provides a polysiloxane compound represented by Formula 1:

wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Y is a $C_{1-15}$ hydrocarbon group including at least one sulfonic acid group; p is an integer from 1 to 2; m is an integer from 0 to 200; and n is an integer from 1 to 200.

In an embodiment, X of Formula 1 is not specifically limited as long as it is a substituent having the ability to hydrolyse, but may be an alkoxy group, an aryloxy group or a halogen. In one embodiment, the number of carbons of the alkoxy group may be in the range of C1 to C10, preferably C6 or less, and more preferably C4 or less. In another embodiment, the number of carbons of the aryloxy group may be in the range of C6 to C12.

When the number of carbons of the alkoxy group and the aryloxy group is too large, the molecular weight of the resulting hydrolyzed product becomes too big to be removed. Also, compatibility with water is poor when water is used as a solvent. Thus, in an embodiment, a lower number of carbons is preferable, and the alkoxy group is preferable. In one embodiment, examples of the alkoxy group include a methoxy group, an ethoxy group, a propanoxy group, a butoxy group, a methoxymethyl group, an ethoxymethyl group, a methoxyethyl group, an ethoxyethyl group, a phenoxy group, etc. and preferably, a methoxy group, an ethoxy group, a butoxy group, etc.

In another embodiment, the hydrolysable substituent can be substituted with a halogen atom selected from the group consisting of chlorine, bromine, and iodine.

In one embodiment, Y of Formula 1 is a $C_{1-15}$ hydrocarbon group including at least one sulfonic acid group, and preferably represented by one of Formula 2 or Formula 3:

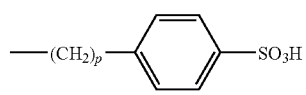

Formula 2

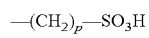 —$(CH_2)_p$—$SO_3H$                    Formula 3 wherein p of both Formula 2 and 3 is an integer from 1 to 5.

In an embodiment, examples of the $C_{1-5}$ hydrocarbon group include: an aromatic group such as a phenyl group, a tolyl group, a naphthyl group, a methylnaphthyl group, etc. substituted with at least one sulfonic acid group; an aromatic substituted alkyl group such as a benzyl group, a naphthylmethyl group, etc.; a methyl group; an ethyl group; an n-propyl group; an i-propyl group; an n-butyl group; an i-butyl group; a t-butyl group; a straight or branched chain pentyl group; a straight or branched chain hexyl group; a straight or branched chain heptyl group; a straight or branched chain octyl group; a cyclohexyl group; a methylcyclohexyl group; and an ethylcyclohexyl group, etc. substituted with at least one sulfonic acid group. In one embodiment, such an aromatic hydrocarbon group or saturated and unsaturated aliphatic hydrocarbon group (including an alicyclic compound) may be a hydrocarbon group containing a substituent such as a halogen atom, an alkoxy group, a nitro group, a hydroxyl group, etc. in other parts of a sulfonic acid group.

In an embodiment, m of Formula 1 may be an integer from 0 to 200, and preferably an integer from 0 to 100. In one embodiment, n of Formula 1 may be an integer from 1 to 200, and preferably an integer from 1 to 100.

According to another embodiment of the invention, a method of preparing the polysiloxane compound of Formula 1 includes: hydrolyzing and condensation polymerizing a compound of Formula 4 and a compound of Formula 5; and sulfonating the resulting product by oxidization if required:

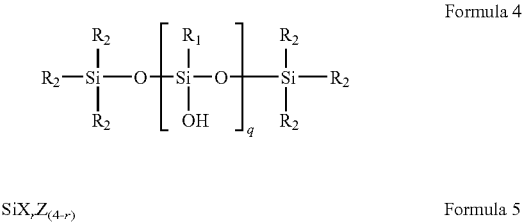

Formula 4

$SiX_rZ_{(4-r)}$                                                           Formula 5 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Z is a $C_{1-15}$ hydrocarbon group including a sulfonic acid group or a sulfur atom which can be converted into a sulfonic acid group by oxidation; r is an integer from 1 to 3; and q is an integer from 1 to 400.

Z of Formula 5 is not specifically limited as long as Z is a $C_{1-5}$ hydrocarbon group including a sulfur atom which can be converted into a sulfonic acid group by oxidation. In one embodiment, Z may be a $C_{1-15}$ hydrocarbon group including a sulfur atom having an oxidation number of 5 or less. More particularly, Z may be a hydrocarbon including a mercapto group, a sulfite group, etc., and preferably, a substituent including a mercapto group.

The type of hydrocarbon groups of Formulas 4 and 5, in an embodiment, may be an alkylene group, an arylene group, an alkenylene group, an aralkylene group, or an alkynylene group, and preferably, an alkylene group or an aralkylene group. These groups may include a subsituent which does not effect the oxidization reaction of a sulfur atom. In an embodiment, the alkylene group may have C4 or less number of carbons, and may be a methylene group, an ethylene group, a propylene group, a butylene group, etc. The alkylene group may have C15 or less number of carbons and may be a group, etc.

In one embodiment, the hydrocarbon group including a sulfur atom which can be converted into a sulfonic acid group by oxidation may be a mercapto alkyl group or a mercapto aryl group. In another embodiment, the mercapto alkyl group may be a mercapto methyl group, 2-mercapto ethyl group, 3-mercapto propyl group, etc. Also, the mercapto aryl group may be a mercapto phenyl group, an alkyl mercapto phenyl group where a methyl or ethyl group is substituted with a benzene ring, etc.

In one embodiment, the compound of Formula 4 may be prepared using a polyhydrosiloxane compound with water and a palladium catalyst as shown in Reaction Formula 1 below:

Reaction Formula 1

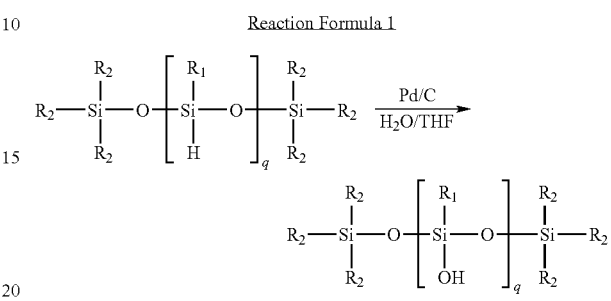

wherein $R_1$, $R_2$, and q are as described above and "THF" is tetrahydrofuran.

In one embodiment, for the compound of Formula 4 and the compound of Formula 5 of the method according to the invention, the mole ratio of the hydroxyl group in the compound of Formula 4 and the compound of Formula 5 may be in the range of 1:0.2 to 1:3.

When the compound of Formula 4 and the compound of Formula 5 are hydrolyzed and condensation polymerized, an acid or base catalyst may be used. In an embodiment, the acid or base catalyst used is not specifically limited, and may be a hydrochloric acid, a nitric acid, a sulfuric acid, an ammonia solution, KOH, NaOH, etc.

When the compound of Formula 4 and the compound of Formula 5 are hydrolyzed and condensation polymerized, the solvent used is not specifically limited as long as the solvent is inactive about a solute. In an embodiment, generally, the solvent may be water and/or an organic solvent and selected accordingly based on the reaction material.

In one embodiment, the organic solvent may be alcohol, glycol derivative, hydrocarbon, ester, ketone, ether, etc., used alone or in combination of two or more types. In an embodiment, the organic solvent has a number of carbons in the range of C1 to C10, preferably C8 or less, and more preferably C6 or less.

In an embodiment, examples of the alcohol include methanol, ethanol, isopropyl alcohol, n-butanol, isobutyl alcohol, octanol, n-propyl alcohol, acetyl acetone, etc.

In one embodiment, examples of the glycol derivative include ethylene glycol, ethylene glycol monomethyl ether, ethylene glycol ethyl ether, ethylene glycol n-propyl ether, ethylene glycol n-butyl ether, propylene glycol monomethyl ether, propylene glycol ethyl ether, propylene glycol monobutyl ether, ethylene glycol monomethyl ether acetate, propylene glycol ethyl ether acetate, propylene glycol monomethyl ether acetate, etc.

In an embodiment, examples of the hydrocarbon include benzene, toluene, xylene, etc.

In one embodiment, examples of the ester include methyl acetate, ethyl acetate, butyl acetate, acetone, methyl acetate, ethyl acetoacetate, etc.

In an embodiment, examples of the ketone include acetone, methyl ethyl ketone, methyl isobutyl ketone, acetyl acetone, etc.

In another embodiment, examples of the ether include ethyl ether, butyl ether, 2-alpha-methoxy ethanol, 2-alpha-ethoxyethanol, dioxane, tetrahydrofuran, etc.

A product containing the mercapto group from the product obtained by the hydrolyzing and condensation polymerizing is oxidized to obtain the polysiloxane compound of Formula 1.

During the oxidization, the oxidizer used is not specifically limited and hydrogen peroxide may be used.

The solvent used during the oxidization may be water and/or an organic solvent. The organic solvent may be an alcohol having high solubility to the sulfonic acid group and low phase separability to water. In an embodiment, considering compatibility with water and convenient removal of the solvent, the number of carbons of the alcohol may be in the range of C1 to C6, preferably C4 or less, and more preferably C2 or less. More particularly, in one embodiment, the alcohol may be methanol, ethanol, isopropyl alcohol, or butanol, and preferably, methanol or ethanol.

Hereinafter, a polymer electrolyte membrane including a polysiloxane compound of Formula 1 will be described. The polymer electrolyte membrane is in the scope of the invention as long as it includes a polysiloxane compound including sulfonic acid groups according to an embodiment of the invention, and is not limited to the embodiments above or below.

The polymer electrolyte membrane can be prepared only using the polysiloxane compound of Formula 1 of the invention.

According to an embodiment of the invention, the polymer electrolyte membrane may have an interpenetration (IPN) structure of the polysiloxane compound of Formula 1 and another polymer. The other polymer may be selected according to properties which complement the properties of the polysiloxane compound. For example, when ionic conductivity needs to be improved, a polymer having superior ionic conductivity may be used.

According to another embodiment of the invention, an ionic conductive material such as a phosphoric acid may be impregnated into the polymer electrolyte membrane. Methods of impregnating an ionic conductive material are well known to those of ordinary skill in the art, and these include a method of immersing the sulfonated ionic conductive crosslinked copolymer in a phosphoric acid solution.

According to another embodiment of the invention, the polymer electrolyte membrane may have a plurality of layers laminated with polymer membranes formed of the polysiloxane compound of the invention and polymer membranes formed of the other polymer. The polymer membrane formed of the other polymer laminated on the polymer membrane formed of the polysiloxane compound of the invention may be a well known polymer electrolyte membrane, based on the properties needed to be complemented in the polysiloxane compound.

The polymer electrolyte membrane according to the invention may become an excellent polymer electrolyte membrane because methanol crossover is suppressed due to densification of the hydrolysable groups including a substituted hydroxyl group in a silicon atom in a backbone and a substituted siloxane group having a hydrocarbon group containing a sulfonic acid group in a silicon atom in a backbone. Water containability is increased due to the hydroxyl group, thus improving ionic conductivity. Also, ionic conductivity improves more due to the sulfonic acid group.

In one embodiment, a siloxane compound containing a sulfonic acid group may be substituted for some of a plurality of repeating units of the linear polysiloxane compound containing the hydroxyl group, and then polymerized with the nonreactive hydroxyl group. Accordingly, membranes become densified, unlike when a silicon atom in a repeating unit is substituted directly with a sulfonic acid group. Thus, methanol crossover is suppressed. Also, the hydrophilic property of the nonreactive hydroxyl group increases water containability of the membrane, thereby improving ionic conductivity.

Hereinafter, a membrane electrode assembly including the polysiloxane compound of Formula 1 will be described in detail.

The invention provides a membrane electrode assembly including: a cathode including a catalyst layer and a diffusion layer; an anode including a catalyst layer and a diffusion layer; and a polymer electrolyte membrane interposed between the cathode and the anode, wherein the polymer electrolyte membrane includes the polysiloxane compound of Formula 1 according to an embodiment of the invention.

The cathode and the anode, each including a catalyst layer and a diffusion layer, may be formed of a material well known to those of ordinary skill in the art. Also, the polymer electrolyte membrane includes the polysiloxane compound of the invention. In one embodiment, the polymer electrolyte membrane may be used alone or in combination with another membrane having ionic conductivity.

Hereinafter, a fuel cell including the polysiloxane compound of the invention will be described in detail.

One embodiment of the invention provides a fuel cell including: a cathode including a catalyst layer and a diffusion layer; an anode including a catalyst layer and a diffusion layer; and a polymer electrolyte membrane interposed between the cathode and the anode, wherein the polymer electrolyte membrane includes the polysiloxane compound of Formula 1.

In an embodiment, the fuel cell includes a cathode, an anode, and a polymer electrolyte membrane between the cathode and the anode.

In one embodiment, the cathode and the anode each include a gas diffusion layer and a catalyst layer.

In an embodiment, the catalyst layer includes a metal catalyst which catalyzes related reactions such as oxidization of hydrogen and deoxidization of oxygen, and may include at least one catalyst selected from the group consisting of platinum, ruthenium, osmium, platinum-osmium alloy, platinum-palladium alloy and platinum-M alloy, wherein M is at least one transition metal selected from the group consisting of Ga, Ti, V, Cr, Mn, Fe, Co, Ni, Cu and Zn. Preferably, the catalyst layer may include at least one catalyst selected from the group consisting of platinum, ruthenium, osmium, platinum-ruthenium alloy, platinum-osmium alloy, platinum-palladium alloy, platinum-cobalt alloy, and platinum-nickel alloy.

In an embodiment, the metal catalyst may be supported in a carrier. Such a carrier may be carbon, such as acetylene black or graphite, or inorganic particles, such as alumina, silica, etc. When a noble metal supported in a carrier is used as a catalyst, such a catalyst can be bought from the market or prepared by impregnating a noble metal in a carrier.

In an embodiment, the gas diffusion layer may be carbon paper or carbon cloth, but is not limited thereto. The gas diffusion layer supports the anode or cathode for a fuel cell while diffusing reaction gas to the catalyst layer so that reaction gas can easily flow to the catalyst layer. Also, the carbon paper or the carbon cloth may be hydrophobically coated with a fluorine based resin, such as polytetrafluoroethylene, so that gas diffusion efficiency does not deteriorate due to water generated during the operation of the fuel cell.

In another embodiment, to increase gas diffusion efficiency between the gas diffusion layer and the catalyst layer, the anode or cathode may further include a microporous layer. The microporous layer is formed by applying a conductive material such as carbon powder, carbon black, activated carbon, acetylene black, etc., a binder such as polytetrafluoroethylene, and a compound containing ionomer if required on the anode or cathode.

In an embodiment, the fuel cell according to the invention may be a phosphoric acid fuel cell, a polymer electrolyte membrane fuel cell, or an alkaline full cell, and preferably, a direct methanol fuel cell (DMFC).

Hereinafter, a DMFC according to an embodiment of the invention using the polymer electrolyte membrane described above will be described with reference to FIG. 1.

FIG. 1 is a view illustrating a structure of a DMFC according to an embodiment of the invention. Referring to FIG. 1, the DMFC includes an anode 32 supplying a fuel, a cathode 30 supplying an oxidizer, and a polymer electrolyte membrane 41 formed using the above-described process and interposed between the anode 32 and the cathode 30. Generally, the anode 32 includes an anode diffusion layer 22 and an anode catalyst layer 33, and the cathode 30 includes a cathode diffusion layer 23 and a cathode catalyst layer 31.

A first separator 40 has a flow channel to supply fuel to the anode 32 and may serve as an electron conductor to transfer electrons generated in the anode 32 to an external circuit or an adjacent unit cell. A second separator 50 has a flow channel to supply an oxidizer to the cathode 30 and may serve as an electron conductor to transfer electrons supplied from external circuit or an adjacent unit cell to the cathode 30. In the DMFC, an aqueous methanol solution is mostly used as the fuel and air is mostly used as the oxidizer.

The aqueous methanol solution transferred to the anode catalyst layer 33 through the anode diffusion layer 22 decomposes into electrons, hydrogen ions, carbon dioxide, etc. The hydrogen ions are transferred to the cathode catalyst layer 31 through the polymer electrolyte membrane 41, the electrons are transferred to an external circuit, and carbon dioxide is discharged outside. In the cathode catalyst layer 31, the hydrogen ions transferred from the polymer electrolyte membrane 41, the electrons supplied from an external circuit, and oxygen in air transferred from the cathode diffusion layer 32 react to form water. The cathode 30 and the anode 32 including the catalyst layers 31 and 33 and the diffusion layers 32 and 22 may be formed of materials well known to those of ordinary skill in the art. In one embodiment, the polymer electrolyte membrane 41 includes the polysiloxane compound of the invention. The polymer electrolyte membrane may be used alone or in combination with another membrane having ionic conductivity.

Such fuel cells may be prepared using conventional methods, and thus detailed descriptions thereof will be omitted.

Embodiments of the invention will be described in greater detail with reference to the following examples. The following examples are for illustrative purposes only and are not intended to limit the scope of the invention.

PREPARATION EXAMPLE 1

Preparation of Hydroxyl-substituted Polymethylhydrosiloxane 10 g of polymethylhydrosiloxane (available from Aldrich, trimethylsilyl terminated, about 5,000 of average molecular weight, n is about 80) was injected into a flask, and then was diluted with 100 ml of tetrahydrofuran. 200 mg of 10 wt % Pd/C (palladium/charcoal) was added into the flask. Subsequently, 177.8 mmol (3.20 ml) of distilled water was added into the flask, and hydrogen gas generated during this time was removed. A reaction was performed for 15 hours at room temperature. After the reaction, the resultant was filtered through celite and $MgSO_4$, and then the filtrate was left at a reduced pressure of about 0.1 torr to remove volatile materials. Accordingly, a 10 wt % substituted polymethylhydrosilane solution was obtained. Hydroxyl substitution of the 10 wt % substituted polymethylhydrosiloxane solution was confirmed using IR spectrum.

PREPARATION EXAMPLE 2

Preparation of Sulfonated Phenethyltrimethoxysilane 11.3 g of phenethyltrimethoxysilane (PETMS) was injected to a 40 ml vial, and then while stirring, 5.8 g of chlorosulfonic acid was slowly, dropwise added to the 40 ml vial. The mixture was stirred for 3 hours at ambient temperature. Accordingly, sulfonated phenethyltrimethoxysilane was obtained by cleaning the mixture with methylene chloride.

PREPARATION EXAMPLE 3

Preparation of Sulfonated poly(ether ether)ketone (SPEEK) (m1=0.8, n1=0.2, k1=1 in Reaction Formula 2)

Reaction Formula 2

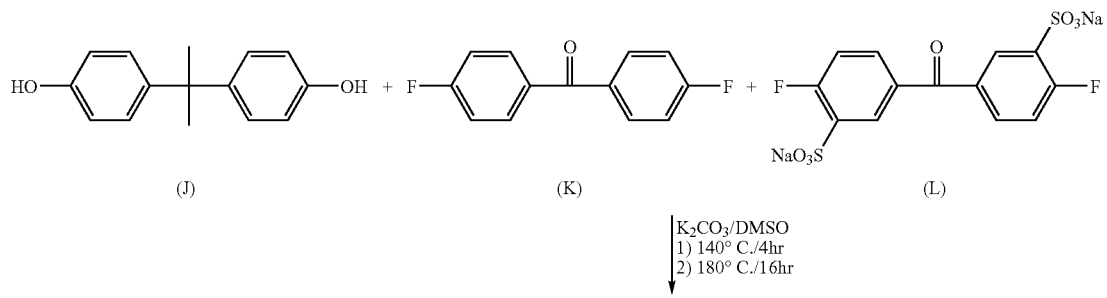

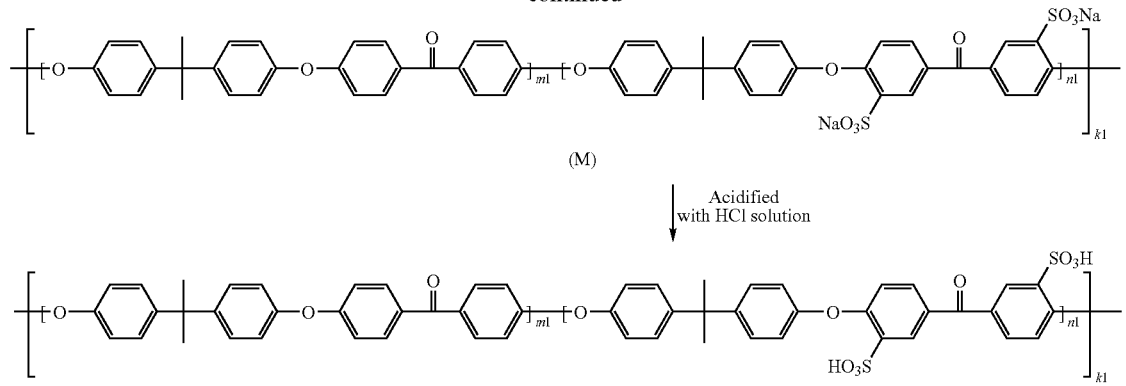

(M)

Acidified with HCl solution 10.812 g (47.36 mmol) of compound J, 8.267 g (37.88 mmol) of compound K, 4.0 g (9.47 mmol) of compound L, and 8.5 g of anhydrous K$_2$CO$_3$ were injected into a 250 ml 3 hole flask installed with a Dean-Stark trap. Then 120 ml of dimethylsulfoxide and 60 ml of toluene were added into the 250 ml 3 neck flask as solvents.

The mixture was refluxed for 4 hours at 140° C. with nitrogen, and water generated during this time was removed, and then toluene was removed. The reaction temperature was then increased to 180° C. and polymerization was performed for 16 hours at the same temperature. The resultant was cooled to ambient temperature, and then was precipitated into methanol. To remove inorganic substances, the precipitated copolymer was washed with hot water 3 times. Accordingly, the copolymer formed was dried for 24 hours at 100° C.

The copolymer in sodium salt state was dissolved in dimethylsulfoxide, and then dilute hydrochloric acid was added thereto. The reaction was performed for 24 hours, and then the product was precipitated into a compound of methanol and water to prepare a conductive copolymer substituted with hydrogen ions.

EXAMPLE 1

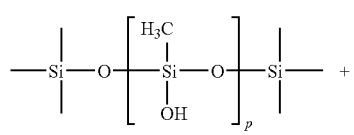

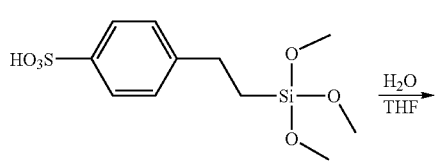

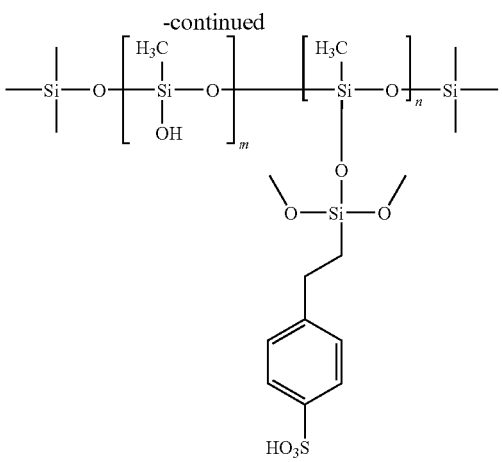

5.7 g of hydroxyl-substituted polymethylhydrosiloxane obtained from Preparation Example 1 was injected into a 40 ml vial, and then while stirring, 2.57 g of sulfonated phenethyltrimethoxysilane obtained from Preparation Example 2 was added. 0.27 g of distilled water was slowly, dropwise added to the mixture. Subsequently, a polysiloxane compound substituted with sulfonated phenethyl trimethoxysilane was prepared by hydrolyzing and condensation polymerizing the resultant for 5 hours in a 60° C. waterbath.

10 wt % polysiloxane compound prepared as above and 90 wt % sulfonated poly(ether ether)ketone obtained from Preparation Example 3 were completely dissolved in n-methylpyrrolidone. Then the product was cast and then dried using a hot plate at 80° C. and then at 120° C. each for 2 hours to prepare a polymer electrolyte membrane. The polymer electrolyte membrane was immersed in distilled water for 24 hours.

EXAMPLE 2

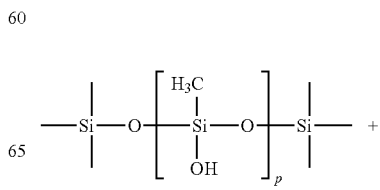

-continued

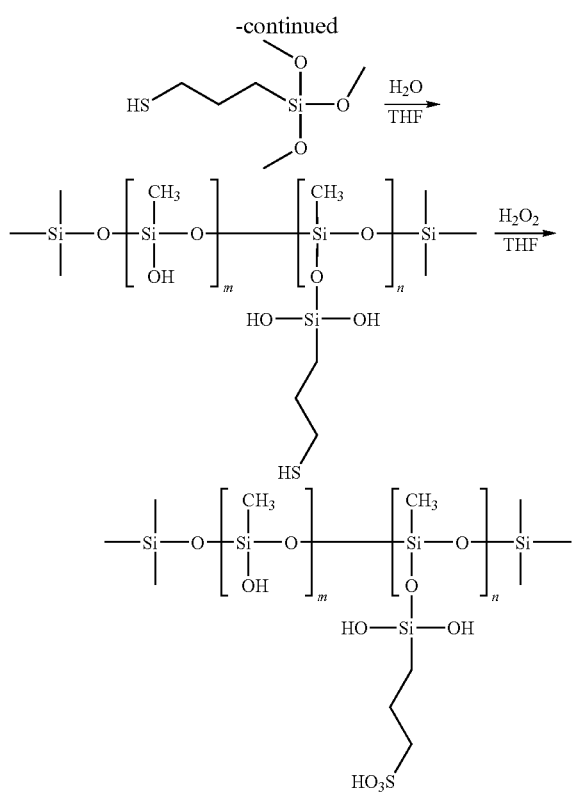

5.7 g of hydroxyl-substituted polymethylhydrosiloxane obtained from Preparation Example 1 was injected into a 40 ml vial, and then while stirring, 1.47 g of 3-mercaptopropyltrimethoxysilane was added. Next, 0.27 g of 0.01 N aqueous hydrochloric acid solution was slowly, dropwise added to the 40 ml vial. Subsequently, a polysiloxane compound substituted with 3-mercaptopropyl trimethoxysilane was prepared by hydrolyzing and condensation polymerizing the resultant for 5 hours in a 60° C. waterbath.

10 wt % polysiloxane compound prepared as above and 90 wt % sulfonated poly(ether ether)ketone obtained from Preparation Example 3 were completely dissolved in n-methylpyrrolidone. Then the product was cast and then dried using a hot plate at 80° C. and then at 120° C. each for 2 hours to prepare a polymer electrolyte membrane. The polymer electrolyte membrane was immersed in 80° C. hydrogen peroxide for 3 hours, then washed with distilled water, and then immersed in distilled water for 24 hours.

COMPARATIVE EXAMPLE 1

A polymer electrolyte polymer was obtained in the same manner as in Example 1, except that only sulfonated poly (ether ether)ketone prepared from Preparation Example 3 was used as a polymer electrolyte material.

COMPARATIVE EXAMPLE 2

A polymer electrolyte polymer was obtained in the same manner as in Example 1, except that a mixture of 90 wt % sulfonated poly(ether ether)ketone and $SiO_2$ (available from Japanese Chemical Industry Co., size of particles in the range of 10-20 nm) was used as a polymer electrolyte material.

COMPARATIVE EXAMPLE 3

A NAFION 117 film manufactured by DuPont was immersed in distilled water for 24 hours.

Proton conductivity and methanol permeability of the polymer electrolyte membranes of Examples 1 and 2 and Comparative Examples 1 through 3 were measured. The results are shown in Table 1 below.

TABLE 1

| | Proton conductivity (S/cm) | Methanol permeability ($cm^2$/sec) |
| --- | --- | --- |
| Example 1 | $3.32 \times 10^{-3}$ | $7.14 \times 10^{-8}$ |
| Example 2 | $4.71 \times 10^{-3}$ | $7.31 \times 10^{-8}$ |
| Comparative Example 1 | $0.95 \times 10^{-3}$ | $7.46 \times 10^{-8}$ |
| Comparative Example 2 | $1.52 \times 10^{-3}$ | $1.43 \times 10^{-7}$ |
| Comparative Example 3 | $3.19 \times 10^{-2}$ | $1.58 \times 10^{-6}$ |

Referring to Table 1, methanol permeability of the polymer electrolyte membranes of Examples 1 and 2 which used the polysiloxane compound of the invention is remarkably low compared to the polymer electrolyte membrane of Comparative Example 3 which used the conventional NAFION polymer. Also, proton conductivity of the polymer electrolyte membranes of Examples 1 and 2 is much higher than the polymer electrolyte membranes of Comparative Examples 1 and 2 using the conventional sulfonated poly(ether ether) ketone and a mixture of sulfonated poly (ether ether)ketone and $SiO_2$.

Also, properties of the polymer electrolyte membrane using the polysiloxane compound of the invention are excellent compared to the polymer electrolyte membranes of Comparative Examples 1 to 3.

The invention provides a polysiloxane compound including a group substituted with a sulfonic acid group as a side chain. Using such a polysiloxane compound, a polymer electrolyte membrane which has superior dimensional stability and can remarkably reduce methanol crossover or remarkably increase ionic conductivity without sacrificing methanol crossover can be prepared by suppressing swelling caused by liquid.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A polysiloxane compound represented by Formula 1:

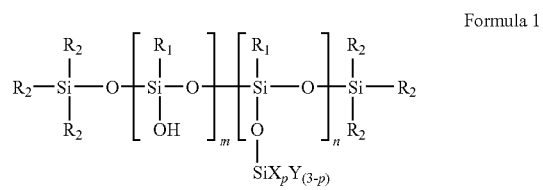

Formula 1 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Y is a $C_{1-15}$ hydrocarbon group comprising at least one sulfonic acid group; p is an integer from 1 to 2; m is an integer from 0 to 200; and n is an integer from 1 to 200.

2. The polysiloxane compound of claim 1, wherein Y is a group represented by Formula 2:

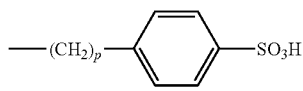

Formula 2 wherein p is an integer from 1 to 5.

3. The polysiloxane compound of claim 1, wherein Y is a group represented by Formula 3:

—(CH$_2$)$_p$SO$_3$H     Formula 3 wherein p is an integer from 1 to 5.

4. A method of preparing a polysiloxane compound comprising:
hydrolyzing and condensation polymerizing a compound of Formula 4 and a compound of Formula 5:

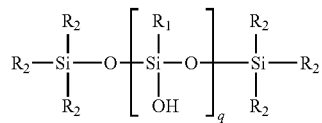

Formula 4

SiX$_r$Z$_{(4-r)}$     Formula 5 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Z is a $C_{1-15}$ hydrocarbon group comprising a sulfonic acid group or a sulfur atom which can be converted into a sulfonic acid group by oxidation; r is an integer from 1 to 3; and q is an integer from 1 to 400.

5. The method of claim 4, the method further comprising oxidizing the sulfur atom of Z to a sulfonic acid group.

6. The method of claim 4, wherein the mole ratio of the hydroxyl group in the compound of Formula 4 and the compound of Formula 5 is in the range of 1:0.2 to 1:3.

7. A polymer electrolyte membrane comprising a polysiloxane compound represented by Formula 1:

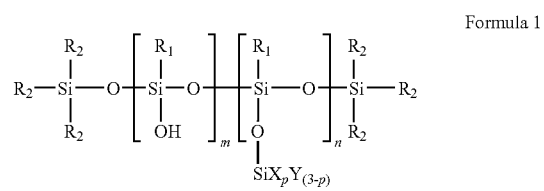

Formula 1 wherein each $R_1$ is independently selected from the group consisting of a hydrogen atom, an alkyl group, and an aryl group; each $R_2$ is independently selected from the group consisting of a hydrogen atom, a hydroxyl group, an alkoxy group, an acetoxy group, an alkyl group, an aryl group, and an —O—Si(OR)$_3$ group wherein R is a $C_{1-3}$ alkyl group; each X is independently selected from the group consisting of halogens, a hydroxyl group, an alkoxy group, and an acetoxy group; Y is a $C_{1-15}$ hydrocarbon group comprising at least one sulfonic acid group; p is an integer from 1 to 2; m is an integer from 0 to 200; and n is an integer from 1 to 200.

8. A polymer electrolyte membrane comprising the polysiloxane compound of claim 2.

9. A polymer electrolyte membrane comprising the polysiloxane compound of claim 3.

10. A membrane electrode assembly comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 1.

11. A membrane electrode assembly comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 2.

12. A membrane electrode assembly comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 3.

13. A fuel cell comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 1.

14. A fuel cell comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 2.

15. A fuel cell comprising:
a cathode comprising a catalyst layer and a diffusion layer;
an anode comprising a catalyst layer and a diffusion layer; and
a polymer electrolyte membrane interposed between the cathode and the anode,
wherein the polymer electrolyte membrane comprises the polysiloxane compound of claim 3.

* * * * *